United States Patent
Knight et al.

(10) Patent No.: US 7,206,186 B1
(45) Date of Patent: Apr. 17, 2007

(54) HERMETICALLY SEALED ELECTROLYTIC CAPACITOR

(75) Inventors: Philip A. Knight, Greer, SC (US); Samuel G. Parler, Jr., Clemson, SC (US); Jerry W. Norris, Greenville, SC (US)

(73) Assignee: Cornell Dubilier Marketing, Inc., Liberty, SC (US)

( * ) Notice: Subject to any disclaimer, the term of this patent is extended or adjusted under 35 U.S.C. 154(b) by 0 days.

(21) Appl. No.: 11/443,910

(22) Filed: May 31, 2006

(51) Int. Cl.
*H01G 4/00* (2006.01)

(52) U.S. Cl. ............. 361/301.3; 361/518; 361/519; 361/523; 361/528; 361/535; 361/536

(58) Field of Classification Search ......... 361/301.3, 361/302, 516–520, 523–528, 535, 536, 502–504, 361/508–512
See application file for complete search history.

(56) References Cited

U.S. PATENT DOCUMENTS

| | | | |
|---|---|---|---|
| 3,243,668 A | 3/1966 | Diggens | 317/230 |
| 3,255,386 A | 6/1966 | Millard et al. | 317/230 |
| 3,273,028 A | 9/1966 | Sparkes | 317/230 |
| 3,275,901 A | 9/1966 | Merritt et al. | 317/230 |
| 3,275,902 A | 9/1966 | McHugh et al. | 317/230 |
| 3,289,051 A | 11/1966 | Sloan | 317/230 |
| 3,297,918 A | 1/1967 | Booe | 317/230 |
| 3,301,270 A | 1/1967 | Horn | 317/230 |
| 3,341,751 A | 9/1967 | Clement | 317/230 |
| 3,515,951 A | 6/1970 | Krasienko et al. | 317/230 |
| 3,611,054 A | 10/1971 | Piper et al. | 317/230 |
| 3,624,458 A | 11/1971 | Howell et al. | 317/230 |
| 3,624,460 A | 11/1971 | Correll | 317/230 |
| 3,646,405 A | 2/1972 | Wallis et al. | 317/230 |
| 3,684,927 A | 8/1972 | Correll | 317/230 |
| 3,697,823 A | 10/1972 | Correll | 317/230 |
| 3,906,311 A | 9/1975 | Shoot et al. | 317/230 |
| 4,025,827 A | 5/1977 | Pellerin et al. | 361/433 |
| 4,296,458 A | 10/1981 | Smith et al. | 361/433 |
| 4,683,516 A | 7/1987 | Miller | 361/328 |
| 4,987,519 A | 1/1991 | Hutchine et al. | 361/518 |
| 4,992,910 A | 2/1991 | Evans | 361/502 |
| 5,148,347 A * | 9/1992 | Cox et al. | 361/272 |
| 5,777,840 A | 7/1998 | Oney | 361/519 |
| 5,926,362 A * | 7/1999 | Muffoletto et al. | 361/503 |
| 6,058,006 A * | 5/2000 | Yoshioka et al. | 361/511 |
| 6,064,563 A * | 5/2000 | Yamada et al. | 361/521 |
| 6,711,000 B2 * | 3/2004 | Takeishi et al. | 361/523 |
| 6,952,339 B1 | 10/2005 | Knowles | 361/528 |

OTHER PUBLICATIONS

Macomber et al.; "Longlife, High-Voltage, Hermetically-Sealed Aluminum Electrolytic Capacitors"; 16th Capacitor and Resistor Technology Symposium; Mar. 11-15, 1996.

\* cited by examiner

*Primary Examiner*—Nguyen T. Ha

(57) ABSTRACT

An electrolytic capacitor is provided having a metal-glass-metal hermetic seal and a liquid seal, which protects the hermetic seal from the electrolyte solution in the capacitor. The liquid seal is formed by compressing an elastomeric ring between the underside of the lid of the capacitor and a terminal plate, connected to the capacitor element, whereby compression of the elastomeric seal is maintained by the lead, which connects the terminal plate and a metal post in the hermetic seal.

20 Claims, 2 Drawing Sheets

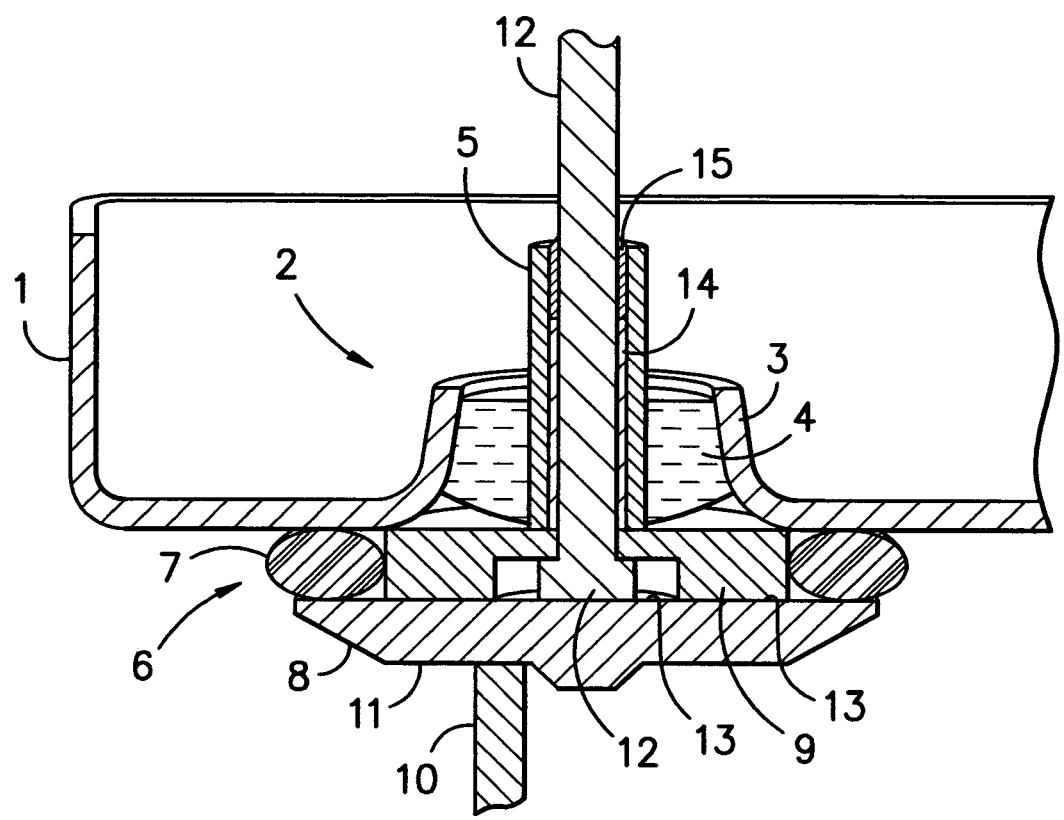
FIG. -1-

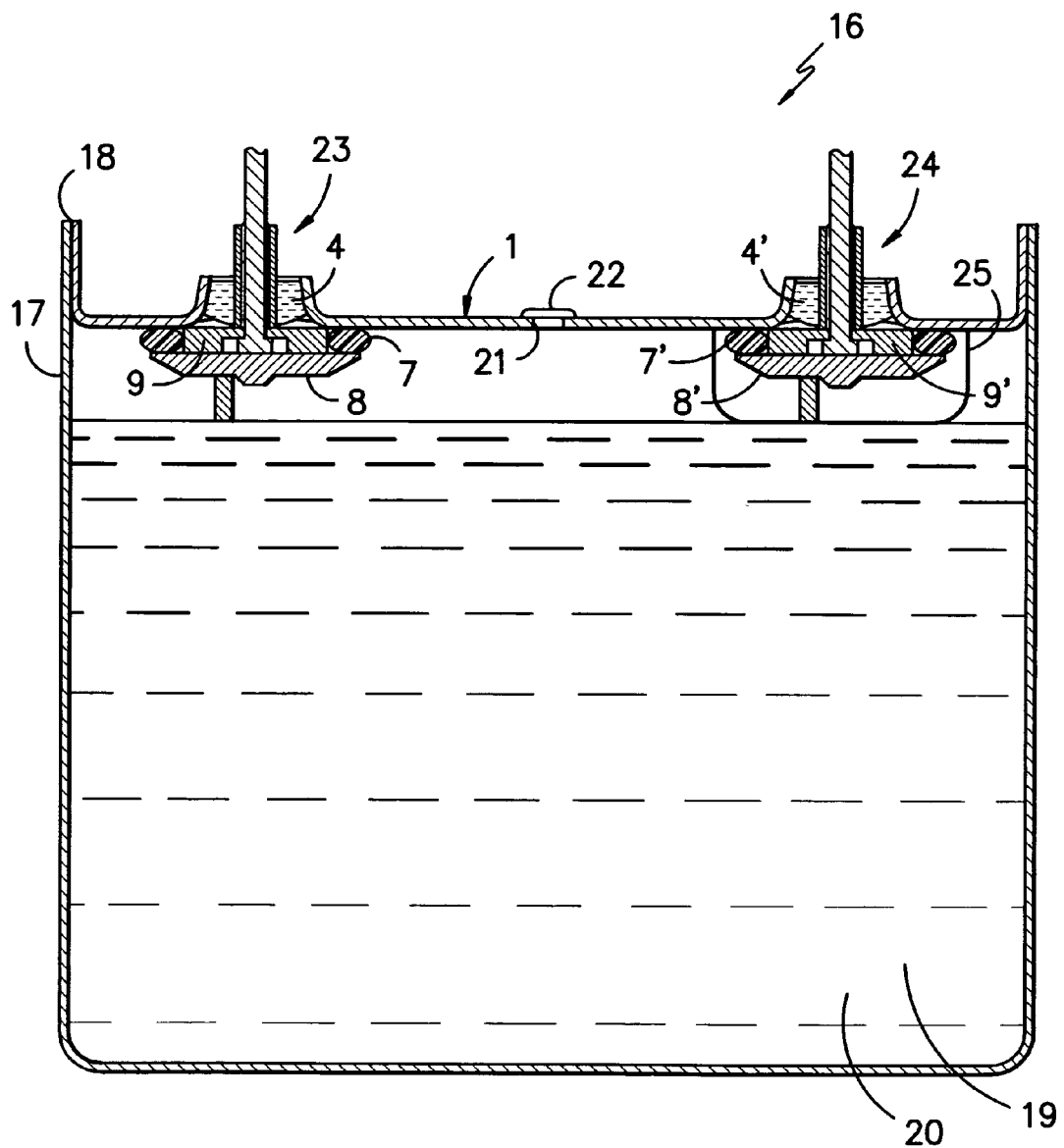
FIG. -2-

HERMETICALLY SEALED ELECTROLYTIC CAPACITOR

BACKGROUND OF THE INVENTION

This invention relates generally to the field of electrolytic capacitors that are hermetically sealed, and in particular to a capacitor having a liquid-tight seal between the electrolyte solution and the terminal used to make an electrical connection between the capacitor and an external device.

Capacitors containing an electrolyte solution are subject to failure caused by leakage of the electrolyte liquid or vapor. For example, it is common for gas, such as hydrogen, to be evolved during operation, causing pressure to build inside the capacitor. Consequently, leaks may occur around conventional non-hermetic polymeric seals, where terminal wires protrude from the capacitor casing. To avoid this, a gas-tight hermetic seal is required.

One prior art solution has been to provide a hermetic, outer-metal/glass/inner-metal seal between the capacitor casing and the terminal wire. For the sake of clarity, the casing, typically the lid, is referred to as the "outer-metal" component, and the electrically conducting post, which is insulated by the glass, is referred to as the "inner-metal" component. Typically, the hermetic seal is positioned in an orifice, created in the lid of the casing. In the situation of an aluminum case, it has not proven economical, however, to provide a hermetic, aluminum to glass seal, due in part to the significant difference in the thermal coefficient of expansion of the glass or ceramic material used to construct the seal and the thermal coefficient of expansion of aluminum. Consequently, the hermetic seals used in capacitors are generally made with a metal other than aluminum, for example, steels (stainless or other alloys) or tantalum. Although the outer-metal portion of the seal is at approximately the same potential as the electrolyte, in general, the outer metal is integral with or welded to the case or lid metal, and should be of the same material in order to avoid galvanic corrosion if this region is exposed to the ionically conducting electrolyte.

To avoid galvanic corrosion of the inner-metal portion of the hermetic seal, a liquid-tight seal is typically utilized to prevent exposure of the inner region of the hermetic seal to the electrolyte. Even in the most optimum situation in which all components along the electrically conducting path between the inner-metal portion of the hermetic seal and the anode of the capacitor element consist of the same "valve metal", so that galvanic corrosion is not an issue due to a dissimilar metal junction, a liquid-tight seal is still used to prevent the electrolyte from making contact with any portion of this conductive path. A "valve metal" is defined as a metal which grows an electrically insulating oxide in the presence of an electrolyte when a positive potential is applied to the metal with respect to the electrolyte. Examples of such metals are aluminum, tantalum, niobium, tungsten, titanium, zirconium. The two primary reasons that the inner portion of the hermetic seal, including a valve metal seal, should be protected from the electrolyte are the possibilities of intermetallics (impurities) in the valve metal that may not form a proper electrically insulating oxide in the presence of an electrolyte and/or insufficient creepage distance across the glass portion of the seal. Either of these two situations could result in undesirable electrical current flow between the high electrical potential of the inner-metal and the low potential of the outer-metal if the electrolyte is allowed access to all regions of the hermetic seal.

Various capacitor constructions have been disclosed to protect the components of the hermetic seal from corrosion. Sloan, U.S. Pat. No. 3,289,051, discloses a threaded cap containing a hermetic seal, which is screwed on the lid of the capacitor to compress a stack of bushing members. The apparatus of Sloan is complex to manufacture, requiring the assembly of numerous components, many of which must be welded together to maintain the hermeticity of the capacitor.

In U.S. Pat. No. 4,987,519, Hutchins et al. disclose a cylindrical capacitor with a seal created by crimping. An inwardly directed annular bead is formed, which presses an O-ring into a plastic bushing. While the foregoing technique has found utility with cylindrical capacitors, it is not effective for sealing capacitors having other geometric configurations, such as a rectangular prism. Additionally, the capacitor disclosed in U.S. Pat. No. 4,987,519 requires a second seal where the riser wire protrudes from the plastic bushing.

Capacitors having a non-cylindrical casing, especially capacitors having a casing with a flat surface, are particularly difficult to seal. Prior art methods of sealing the liquid typically employ a gasket or seal around the inside perimeter of the casing. As gas pressure builds inside the capacitor, the flat surface may bulge outward, creating a gap between the O-ring or gasket and the casing. Electrolyte can seep through the gap and corrode the terminal in the hermetic seal.

SUMMARY OF THE INVENTION

The object of the present invention is to overcome the aforementioned limitations and shortcomings of the prior art. The present invention features high reliability due to the simplicity of construction and low parts count. It may be employed with virtually any capacitor shape, including rectangular prism shapes. The capacitor features a liquid seal that takes up a minimum of space inside the capacitor and does not protrude from the outside of the capacitor. The capacitor of the present invention is inexpensive to manufacture relative to prior art hermetically sealed capacitors. A further advantage of the present invention is that should gas pressure build up inside of the capacitor, the liquid seal will not be compromised due to swelling of the case sides because the seal integrity does not depend on maintaining the physical dimensions of the capacitor case.

The capacitor of the present invention is hermetically sealed, which is defined as having a permeability to helium gas of $10^{-7}$ cc/second or less, at 25° C. and one atmosphere of differential pressure.

The capacitor is housed in a case, which is a receptacle having an opening at one end. The case is made from a material that is substantially impermeable to gases. By way of example, the case may be made out of metal, in particular, steels (stainless or other alloys) or tantalum. If the case material is susceptible to corrosion by an electrolyte solution, the material may be coated, plated or provided with other protective treatment, as is known to those skilled in the art.

An advantage of the present invention is that its performance is not dependent upon the case having any particular shape. By way of example, the case may be in the shape of a cylinder, rectangular prism or parallelepiped.

A capacitor element is positioned inside the case. The capacitor element is made up of an anode, a cathode, a dielectric and an electrolyte solution, forming a capacitor capable of supporting a direct current potential, and thereby storing an electrical charge and energy. The anode is a valve metal upon which resides a dielectric, which is generally grown from the base metal in an anodizing electrochemical bath. The anode metal contacts the dielectric on its positively charged side, and the electrolyte contacts the dielectric on its negatively-charged side and conveys the charge to the cathode.

The potentials of the anode and cathode may be conducted to positive and negative terminals, respectively, by means of a tab, wire or other metallic conductor. With respect to the cathode, the capacitor case may be used for the negative terminal.

The anode is prepared from a valve metal. The anode need not be in a specific form, and may, for example be in the form of a plate, foil, pellets or a porous solid. Any of the forms may be treated to enhance their performance, as is known in the art. For examples, foils may be etched to increase their surface area, and pellets may be pressed and sintered to fuse the grains and maintain interstices.

In the case of a polarized, wet electrolytic capacitor, the cathode may be the same or a different metal than the anode or a non-metal, and it is not required that the cathode be capable of forming an oxide. The form of the cathode is selected to be compatible with the anode, to meet the objective of creating a capacitor. This invention can be employed with both polarized and non-polarized wet electrolytic capacitors.

An electrolyte solution is added to the case in sufficient quantity to immerse the capacitor element. Generally, the electrolyte solution may be formed of solutes that ionize upon dissolution in a suitable solvent to create an electrically conductive medium. Examples of suitable solutes include organic acids and bases, and inorganic acids and bases. Examples of suitable solvents include water, ethylene glycol, dimethylformamide (DMF), N-methylformamide (NMF), and gamma-butyrolactone (GBL). Particularly useful electrolyte solutions include aqueous sulfuric acid, aqueous boric acid and ammonium adipate.

Gas may be evolved during operation of the capacitor, over time. The build up of gas pressure in the capacitor may be reduced by providing a depolarizing agent in the electrolyte solution, such as p-nitrophenol or nitroacetophenone.

The capacitor is sealed by a lid bonded to the open side of the case. The lid is generally constructed from the same material as the case. The lid is bonded to the case to create a hermetic seal, using a suitable technique, including by soldering, welding, such as a tungsten inert gas weld (TIG), plasma weld, or laser weld, or other means to create a metallurgical bond.

The lid has an orifice, and a metal post is positioned in the orifice and electrically insulated from the lid by a metal-glass-metal hermetic seal. Ordinarily, the metal post will be aligned perpendicular to the lid, but the precise angle may be varied, provided that the metal post is not in contact with the body of the lid. With regard to the hermetic seal, the term "glass" is intended to encompass glass, for example, sodium glass, as well as ceramic materials that are capable of bonding to the lid and the metal post and forming a barrier that is impermeable to gas.

The metal post may be made out of the same or different metal as the lid, and the metal post is electrically conductive. The metal post may be a solid rod or may be hollow. The metal post may be cylindrical, or it can have flat edges. For example, the metal post may have a square, pentagonal or hexagonal cross-section. In one embodiment, the metal post is a hollow tube.

The materials of construction of the lid, glass and metal post are selected to provide compatible coefficients of thermal expansion, imperviousness to gas, and metal to glass adhesion. In one embodiment, the metal-glass-metal hermetic seal is integral with the lid, that is, the lid is a unitary sheet of metal with an orifice formed therein, the glass is bonded directly to the unitary sheet, and the metal post is positioned in the glass. By way of example, the orifice may be formed in the lid by a punch, which stretches the metal to create a cone shaped opening. The metal post is aligned in the opening, without contacting the lid, and molten glass is poured around the post to create a seal.

In addition to the hermetic seal in the lid, the capacitor includes a liquid seal between the electrolyte solution and the metal post, which protects the metal post from corrosion. The liquid seal is formed by an elastomeric ring, which is compressed against the underside of the lid by a terminal plate. The terminal plate is electrically connected to the capacitor element. The elastomeric ring is positioned to encircle the metal post, thereby preventing contact between the metal post and the electrolyte solution.

In one embodiment, the elastomeric ring has a sufficient diameter to extend radially beyond the glass portion of the metal-glass-metal hermetic seal component of the lid. Thus, while it is possible for the elastomeric ring to be compressed against the annular portion of glass in the bottom surface of the lid, it is generally possible to obtain a better seal when the elastomeric ring is compressed against the uniform metal surface of the lid.

In another embodiment of the invention, the elastomeric ring does not contact the sides of the case. For the purposes of the following discussion, the lid is not considered a "side." One may understand that the terminal plate, which compresses the elastomeric ring against the lid is electrified, that is, it is electrically connected to and carries a current from the capacitor element. It is generally desirable that the terminal plate is sufficiently large to overlay the side of the elastomeric ring that it contacts, to ensure uniform compression, without causing the elastomeric ring to be squeezed around the edge of the plate. Therefore, it is desirable that the elastomeric ring is small enough to be covered by the terminal plate, without the electrified terminal plate coming in contact with the sides of the case.

The elastomeric ring is selected from an elastomer that is resistant to chemical attack by the electrolyte solution and has sufficient dielectric strength to withstand the maximum voltage generated by the capacitor. The elastomeric ring is capable of insulating the lid from the terminal plate. In one embodiment, the elastomer is required to perform over a temperature range of −55° C. to 200° C., without degradation or loss of elasticity. Examples of elastomers that may be employed include butyl rubber, chlorobutyl rubber, ethylene propylene rubber (EPR), ethylene propylene diene rubber (EPDM), fluoroelastomers, such as Viton®, polytetrafluoroethylene, such as Teflon®, polychloroprene rubber, such as Neoprene®, butadiene rubber, nitrile rubber, isoprene rubber, silicone rubber and styrene butadiene rubber.

The degree to which the elastomeric ring is compressed to create a liquid seal will vary somewhat, depending upon the elastomer employed. By way of example, the elastomeric ring may be compressed to about 70 to 85% of its original thickness, to create a seal.

The terminal plate is a valve metal. The terminal plate has a wet side, electrically connected to the capacitor element and a dry side, facing the bottom of the lid. The terminal plate may be connected to the capacitor element by a lead, which, for example, may be round, flat or multifilament wire. The terminal plate may be connected to either the anode or the cathode of the capacitor element. In one embodiment of the invention, it is desirable that the terminals for both the anode and the cathode be accessible in the lid of the capacitor. For example, in certain "flat" capacitor designs, the anode and cathode are both positioned in the lid of a rectangular prism shaped capacitor. Accordingly, the lid may be provided with two metal-glass-metal hermetic seals and two liquid seals, that is, one each for the anode and cathode. Additionally, an insulator may be provided on the underside of the terminal plate for the anode. The insulator is generally a polymer washer such as polypropylene that served to prevent physical contact between the anode lead of the capacitor element and other metallic components at different electrical potentials.

The dry side of the terminal plate is electrically connected to the metal post. The electrical connection may be by direct attachment, for example, the terminal plate may be welded to the metal post. Or, the electrical connection may be by a lead, which, for example, may be a round, flat or multifilament wire, or a rod, which is in contact with the metal post.

The electrical connection between the terminal plate and the metal post provides the means to maintain compression of the elastomeric ring between the terminal plate and the lid. In one embodiment, the metal post is a hollow tube and the lead is welded to the dry side of the terminal plate. The elastomeric ring is placed around the lead, on the dry side of the terminal plate and the lead is inserted through the hollow tube. The lead may be tensioned, for example, by pulling the lead through the hollow tube, thereby compressing the elastomeric ring between the terminal plate and the underside of the lid, and the hollow tube may be crimped and welded to create a hermetic seal. In another embodiment, the terminal plate may be welded to the metal post, while the elastomeric ring is compressed between the terminal plate and the underside of the lid.

The liquid seal may include a bushing, positioned inside the elastomeric ring, between the terminal plate and the underside of the lid. The bushing (i) functions to align the elastomeric ring and prevent distortion or extrusion, and (ii) acts as a spacer to set the distance between the terminal plate and the lid, thereby preventing the elastomeric ring from being insufficiently compressed or over-compressed. The bushing is made of a non-conductive material. In one embodiment, the shape of the bushing is not distorted by the compression applied to the elastomeric ring.

In embodiments of the invention in which the metal post in the lid is a hollow tube, the tube can be provided with an inner sleeve to align the lead attached to the dry side of the terminal plate. The use of a sleeve is particularly advantageous when the lead is a rod attached to the terminal plate. For example, the rod may be attached perpendicular to the terminal plate and the sleeve will keep the rod from shifting within the hollow tube, which maintains concentricity between the terminal plate, the bushing (if used) and the metal/glass/metal seal and keeps the terminal plate aligned parallel to the lid, to provide uniform compression of the elastomeric seal. The sleeve may be generally any material capable of withstanding solder temperatures, such as steel or brass.

It may be understood that the liquid seal is resistant to failure caused by a gas pressure build-up inside the capacitor. Prior art capacitors having a seal around the inside perimeter of the casing tend to fail, if a build-up in pressure causes the casing to bulge outward. In the present invention, gas pressure within the sealed case will not tend to degrade the seal quality because increased pressure against the elastomeric seal is always balanced by an equal increase in pressure against the underside (or wet side) of the terminal plate.

The lid may be provided with a separate orifice for introducing the electrolyte solution into the capacitor, after the lid has been bonded to the case. For example, the electrolyte may be added through such an orifice and then the orifice may be hermetically sealed, such as by welding.

In an embodiment of the invention wherein the metal post is a hollow tube, it is possible to add the electrolyte solution to the capacitor through such a tube. For example, the following steps may be employed. The wet side of the terminal plate is electrically connected to the capacitor element. A lead is attached to the dry side of the terminal plate and the lead is inserted through an elastomeric ring. Optionally, the lead is also inserted through a bushing, which is positioned inside the elastomeric ring, to help align the ring, relative to the lead. The lead is inserted into the hollow metal post and the lid is bonded to the case. The cross-section of the lead is less than the cross-section of the hollow tube, which allows enough space to feed the electrolyte solution into the capacitor. After the capacitor is filled with the electrolyte solution, the lead is tensioned in order to compress the elastomeric seal against the underside of the lid. A small amount of a rinsing solution may then be introduced into the capacitor, to rinse the electrolyte solution from the inside of the metal post and the dry side of the terminal plate. Optionally, a sleeve may be inserted in the hollow tube and around the lead, to fill the space and align the lead. The lead is held in tension temporarily by means of an external clamping device while the inside surfaces of the hollow metal post and the outer surface of the lead are cleaned and then allowed to dry by means of either time or heat or a combination or both. The lead is then locked into place in a permanent manner (such as by welding or soldering it to the hollow tube, crimping the tube onto the lead, or by the addition of some type of locking clip or ring), thereby maintaining compression of the elastomeric ring. If the means of securing tension in the lead is other than soldering or welding the lead to the hollow tube during the tensioning, then a secondary soldering or welding step is necessary to complete the hermetic seal by filling the void area between the lead and the hollow tube.

BRIEF DESCRIPTION OF THE DRAWINGS

FIG. 1 is a cross-sectional view of the lid of the capacitor, incorporating the liquid seal of the present invention.

FIG. 2 is a cross-sectional view of the capacitor having both the anode and cathode accessible in the lid.

DETAILED DESCRIPTION OF THE INVENTION

Without limiting the scope of the invention, the preferred embodiments and features are hereinafter set forth. All of the United States patents, which are cited in the specification, are hereby incorporated by reference. Unless otherwise indicated, conditions are 25° C., 1 atmosphere of pressure and 50% relative humidity.

Referring to FIG. 1, lid 1 contains an integrally formed metal-glass-metal hermetic seal 2. Hermetic seal is formed by the upturned portion of lid 3, annular glass 4 and a metal post, which in the embodiment shown is hollow tube 5. Liquid seal 6 is formed by elastomeric ring 7 compressed between terminal plate 8 and the underside of lid 1. Bushing 9 is positioned inside elastomeric ring 7, and acts to center elastomeric ring 7 relative to hermetic seal 2, as well fixing the distance between terminal plate 8 and lid 1.

Terminal plate 8 is electrically connected to the anode or cathode of the capacitor element by lead 10 on the wet side 11 of terminal plate 8 and a lead, which in the embodiment shown is rod 12, on the dry side 13 of terminal plate 8. Rod 12 is attached to terminal plate 8 by a weld. Sleeve 14 is inserted between rod 12 and metal post (hollow tube) 5, to maintain alignment of the components of liquid seal 6.

Liquid seal 6 is created by drawing rod 12 through tube 5, thereby compressing elastomeric ring 7. While compression is maintained, rod 12 is attached to tube 5 at soldering 15, thus fixing the position of the aforementioned components. Soldering 15 hermetically seals lid 1.

FIG. 2 shows the assembled capacitor 16. Lid 1 has been welded to case 17, around edge 18, to create a hermetic seal. Capacitor element 19 is positioned in case 17 and immersed in electrolyte solution 20.

The electrolyte solution may be added to the capacitor through opening 21 in lid 1. After the desired quantity of the electrolyte solution is added to capacitor 16, fill plug 22 may be welded in place, to maintain the hermeticity of lid 1.

FIG. 2 shows the embodiment of the invention in which both the cathode terminal 23 and the anode terminal 24 are accessible at lid 1 of capacitor 16. Anode terminal 24 includes insulator 25, which prevents physical contact between the anode and the casing. Except for insulator 25, the metal-glass-metal hermetic seal and liquid seal are essentially the same for the cathode and anode, and have been designated 2 and 2' and 6 and 6', respectively. Likewise, the components of anode terminal 24 that correspond to the components of cathode terminal 23 have been designated with a "prime", for the sake of clarity.

Capacitor 16 may be assembled as follows. Terminal plate 8 is welded to rod 12. One end of lead 10 is welded to the anode of capacitor element 19, and the other end of lead 10 is soldered to terminal plate 8, on the opposite side of attachment of rod 12. The assembly is inserted into case 17. Bushing 9 and elastomeric ring 7 are positioned on the dry side 13 of terminal plate 8. Rod 12 is inserted through tube 5 of metal-glass-metal hermetic seal 2 of lid 1, and lid 1 is welded to case 17. One may understand that when both the anode terminal and the cathode terminal are positioned in the lid, some of the foregoing steps are repeated, in addition to attaching insulator 25 at the anode terminal.

In one embodiment, the entire seal assembly (FIG. 1) is completed for both the anode and cathode terminals before addition of the electrolyte. The electrolyte solution is then added to capacitor 16 though opening 21 in lid 1. Then, fill plug 22 is inserted in opening 21 and welded in place.

In another embodiment of the invention, the electrolyte solution is added to capacitor 16 through tube 5. For example, after lid 1 is welded to case 17, but prior to inserting sleeve 14 into tube 5, rod 12 is lowered into case 17, thereby creating a pathway for the electrolyte solution to flow into capacitor 16. After addition of the electrolyte solution, rod 12 is drawn outward by means of a temporary clamping device to compress elastomeric ring 7. A rinsing solution, such as water, may then be injected into tube 5, to rinse the inside the tube, as well as rod 12 and terminal plate 8. After allowing the assembly to dry, sleeve 14 is inserted into tube 5, and rod 12 is soldered to tube 5.

The invention may be further understood by reference to the following claims.

What we claim is:

1. A capacitor, comprising
    (a) a metal case, having an open side;
    (b) an capacitor element positioned inside the case;
    (c) an electrolyte solution contained in the case and in contact with the capacitor element;
    (d) a metal lid bonded to the open side of the case, the lid having an orifice and a metal post positioned in the orifice, wherein the metal post is electrically insulated by a metal-glass-metal hermetic seal positioned in the orifice;
    (e) a liquid seal between the metal post and the electrolyte solution formed by an elastomeric ring compressed between an underside of the lid and a terminal plate, wherein the elastomeric ring encircles the metal post, wherein the terminal plate has a wet side, facing away from the lid, and a dry side, facing the lid,
    (f) a first electrical connection between the wet side of the terminal plate and the capacitor element, and
    (g) a second electrical connection between the dry side of the terminal plate and the metal post, whereby the compression of the elastomeric ring between the lid and the terminal plate is maintained by the second electrical connection.

2. The capacitor of claim 1, further comprising a non-conductive bushing positioned between the lid and the dry side of the terminal plate and within the elastomeric ring.

3. The capacitor of claim 1, wherein the metal post is hollow.

4. The capacitor of claim 3, wherein the second electrical connection is a lead, wherein the lead has a first end attached to the dry side of the terminal plate, and a second end, inserted into the hollow metal post, tensioned, and attached to the metal post.

5. The capacitor of claim 1, wherein the capacitor has the shape of a rectangular prism.

6. The capacitor of claim 1, further comprising:
    (a) a second orifice positioned in the lid and a second metal post positioned in the second orifice, wherein the second metal post is electrically insulated by a metal-glass-metal hermetic seal positioned in the second orifice;
    (b) a second liquid seal between the second metal post and the electrolyte solution formed by a second elastomeric ring compressed between an underside of the lid and a second terminal plate, wherein the second elastomeric ring encircles the second metal post, wherein the second terminal plate has a wet side, facing away from the lid, and a dry side, facing the lid,
    (c) a third electrical connection between the wet side of the second terminal plate and the capacitor element, and
    (d) a fourth electrical connection between the dry side of the second terminal plate and the second metal post, whereby the compression of the elastomeric ring between the lid and the second terminal plate is maintained by the fourth electrical connection.

7. The capacitor of claim 1, wherein the elastomeric ring is does not contact the sides of case, other than the lid.

8. A capacitor, comprising:
    (a) a metal case, having an open side;
    (b) an capacitor element positioned inside the case;
    (c) an electrolyte solution contained in the case and in contact with the capacitor element;
    (d) a metal lid bonded to the open side of the case, the lid having an orifice and a hollow metal post positioned in the orifice, wherein the metal post is electrically insulated by a metal-glass-metal hermetic seal positioned in the orifice;
    (e) a liquid seal between the metal post and the electrolyte solution formed by an elastomeric ring compressed between an underside of the lid and a terminal plate, wherein the elastomeric ring encircles the metal post, wherein the terminal plate has a wet side, facing away from the lid, and a dry side, facing the lid, (f) a first lead wire electrical connecting the wet side of the terminal plate and the capacitor element, and (g) a second lead wire attached to the dry side of the terminal plate, inserted into the hollow portion of the metal post and attached thereto, whereby the compression of the elastomeric ring between the lid and the terminal plate is maintained by the second lead wire.

9. The capacitor of claim 8, further comprising a non-conductive bushing positioned between the lid and the dry side of the terminal plate and within the elastomeric ring.

10. The capacitor of claim 8, wherein the case has the shape of a rectangular prism and the metal of the case is selected from the group consisting of stainless steel, steel, copper, tantalum, aluminum, titanium, niobium, nickel, iron, and zinc.

11. The capacitor of claim 8, wherein the elastomeric ring neither contact the sides of case, nor contacts the glass component of the metal-glass-metal seal in the lid.

12. The capacitor of claim 8, further comprising:

(a) a second orifice positioned in the lid and a second hollow metal post positioned in the second orifice, wherein the second metal post is electrically insulated by a metal-glass-metal hermetic seal positioned in the second orifice;

(b) a second liquid seal between the second metal post and the electrolyte solution formed by a second elastomeric ring compressed between an underside of the lid and a second terminal plate, wherein the second elastomeric ring encircles the second metal post, wherein the second terminal plate has a wet side, facing away from the lid, and a dry side, facing the lid, (c) a third lead wire electrical connecting between the wet side of the second terminal plate and the capacitor element, and (d) a fourth lead wire electrical connecting attached to the dry side of the second terminal plate, drawn into the hollow portion of the second metal post and attached thereto, whereby the compression of the second elastomeric ring between the lid and the second terminal plate is maintained by the fourth lead wire.

13. A method of making a capacitor, comprising the steps of:

(a) providing a metal case having an open side;
(b) positioning a capacitor element inside the case;
(c) electrically connecting a wet side of a terminal plate to the capacitor element;

(d) electrically connecting a dry side of the terminal plate to a first end of a lead;

(f) inserting the lead through an elastomeric ring, on the dry side of the terminal plate;

(g) providing a metal lid having an orifice and a hollow metal post positioned in the orifice, wherein the metal post is electrically insulated by a metal-glass-metal hermetic seal positioned in the orifice;

(h) inserting the lead through the hollow metal post;

(i) bonding the lid to the open side of the case;

(j) introducing an electrolyte solution into the case, through the hollow metal tube;

(k) tensioning the lead to compress the elastomeric ring between the underside of the lid and the dry side of the terminal plate; and (l) locking the lead into place relative to the hollow metal post and in electrical connection between a second end of the lead and the metal post; and (m) sealing the hollow metal post.

14. The method of claim 13, wherein the terminal plate and hollow metal post are rinsed with a non-corrosive solvent, prior to sealing the hollow metal post.

15. The method of claim 14, wherein the lead is tensioned and the elastomeric ring is compressed between the underside of the lid and the dry side of the terminal plate prior to rinsing.

16. The method of claim 13, wherein the capacitor has the shape of a rectangular prism.

17. The method of claim 13, wherein the elastomeric ring neither contact the sides of case, nor contacts the glass component of the metal-glass-metal seal in the lid.

18. The method of claim 13, further comprising the step of placing a non-conductive bushing within the elastomeric ring, prior to compressing the elastomeric ring between the underside of the lid and the dry side of the terminal plate.

19. The method of claim 13, wherein the lid is provided with having first and second orifices, each having a hollow metal post positioned in the respective orifice, wherein each of the metal posts is electrically insulated by a metal-glass-metal hermetic seal positioned in the respective orifice, and steps (c)–(f), (h) and (k)–(m) are repeated for a lead connected to an anode and a lead connected to the cathode of the capacitor element.

20. The method of claim 19, wherein the capacitor has the shape of a rectangular prism or parallelepiped.

* * * * *